United States Patent
Gastineau et al.

(10) Patent No.: US 6,523,816 B1
(45) Date of Patent: Feb. 25, 2003

(54) METHOD OF DAMPING VIBRATION, ACTIVE HYDRAULIC ANTI-VIBRATION MOUNT AND VEHICLE INCLUDING SUCH A MOUNT

(75) Inventors: Jean-Luc Gastineau, St-Jean-Froidmentel (FR); Sylvain Durand, Villorceau (FR); André Gennesseaux, Conie-Molitard (FR)

(73) Assignee: Hutchinson, Paris (FR)

(*) Notice: Subject to any disclaimer, the term of this patent is extended or adjusted under 35 U.S.C. 154(b) by 0 days.

(21) Appl. No.: 09/707,626

(22) Filed: Nov. 7, 2000

(51) Int. Cl.[7] .............. F16F 5/00; F16F 9/00; F16F 15/00
(52) U.S. Cl. .............. 267/140.14; 267/140.15
(58) Field of Search ................. 267/140.13, 140.14, 267/140.15

(56) References Cited

U.S. PATENT DOCUMENTS

| 5,344,127 A | * | 9/1994 | Hettler et al. | 267/140.13 |
| 5,642,873 A | * | 7/1997 | Kato | 267/140.14 |
| 5,667,205 A | * | 9/1997 | Mutoh et al. | 267/140.13 |
| 5,769,402 A | * | 6/1998 | Ide et al. | 267/140.14 |
| 5,911,412 A | | 6/1999 | Durand et al. | |

FOREIGN PATENT DOCUMENTS

| EP | 0 939 243 | 9/1999 |
| FR | 2 755 489 | 5/1998 |
| FR | 2 782 764 | 3/2000 |
| GB | 2 332 034 | 6/1999 |
| JP | 59117929 | 7/1984 |
| JP | 09317815 | 12/1997 |

\* cited by examiner

*Primary Examiner*—Jack Lavinder
*Assistant Examiner*—Robert A. Siconolfi
(74) *Attorney, Agent, or Firm*—Marshall, Gerstein & Borun (57) ABSTRACT

Active hydraulic anti-vibration mount comprising two support elements connected by an elastomer body partially delimiting a working chamber filled with liquid, this working chamber communicating by a throttled passage with a compensation chamber separated from said working chamber by a rigid partition. The rigid partition is penetrated by a first regulating nozzle closed by a movable exciting device, and a second regulating nozzle closed by a valve the movements of which are limited to correspond to an amplitude of variation in the volume of the working chamber which is less than 20% of the amplitude of the variations in volume generated by the exciting device.

25 Claims, 4 Drawing Sheets

METHOD OF DAMPING VIBRATION, ACTIVE HYDRAULIC ANTI-VIBRATION MOUNT AND VEHICLE INCLUDING SUCH A MOUNT

FIELD OF THE INVENTION

The present invention relates to methods of reducing vibration, to active hydraulic anti-vibration mounts and to vehicles including such mounts, these mounts being intended particularly for mounting motor vehicle engines and producing counter-vibrations aiming to neutralize the effects of the vibration of these engines.

More particularly, the invention concerns a method of damping vibration between two rigid elements by interposing between these elements an active hydraulic anti-vibration mount comprising:

- first and second rigid support elements integral respectively with the two rigid elements to be connected,
- an elastomer body connecting the two support elements and partially delimiting a working chamber filled with a certain volume of liquid,
- a flexible wall partially delimiting a compensation chamber filled with liquid, which chamber is linked to the working chamber by a throttled passage also filled with liquid,
- a rigid partition integral with the second support element and interposed between the working chamber and the compensation chamber, this rigid partition including a first regulating nozzle,
- an exciting device which closes (directly or not) the first regulating nozzle of the rigid partition, this exciting device having a first face communicating with the liquid contained in the working chamber and a second face isolated from said working chamber, said exciting device being so mounted as to be movable perpendicularly to the rigid partition, a method by which the exciting device is caused to vibrate, creating variations in the volume of the working chamber with a first amplitude $\Delta V$ in order to generate counter-vibrations.

BACKGROUND OF THE INVENTION

This known method has the disadvantage that when the exciting device is so activated as to be blocked in a position against a stop, which generally happens while the vehicle is moving, vibrations of relatively high frequency and relatively low amplitude (for example, vibrations with a frequency greater than 20 Hz and an amplitude less than 1 mm) are largely transmitted between the first and second support elements of the anti-vibration mount.

Indeed, the throttled passage connecting the working chamber to the compensation chamber is so dimensioned as to damp the effect of vibration movements of relatively low-frequency (for example, below 20 Hz) and of relatively large amplitude (for example, above 1 mm), but it behaves to a considerable extent as a closed conduit with regard to high-frequency vibrations.

OBJECTS AND SUMMARY OF THE INVENTION

The primary objective of the present invention is to mitigate this disadvantage.

To this end, in the method of the type according to the invention, an anti-vibration mount is used in which the rigid partition is traversed by a second regulating nozzle which is closed by a valve device freely movable perpendicularly to the rigid partition, this valve device having a first face in contact with the liquid contained in the working chamber and a second face isolated from the working chamber, the movements of said valve device being limited by first and second stop devices so as to permit variations in the volume of the working chamber limited to a second amplitude $\delta v$ such that the relationship $\delta v / \Delta V$ is less than 20% at least while the exciting device is being vibrated.

As a result of these arrangements a decoupling is achieved by which the dynamic stiffness of the anti-vibration mount at high frequencies is reduced when the exciting device is not activated, especially while the vehicle is moving. This decoupling is achieved without impairing the generation of counter-vibrations in the working chamber by the exciting device, since the amplitude of the variations in the volume of the working chamber due to the valve is much less than the amplitude of the variations in volume due to the exciting device when said exciting device is displaced in alternating motions to generate counter-vibrations (generally when the vehicle engine is idling).

In preferred modes of realizing the method according to the invention one and/or the other of the following arrangements can additionally be used if appropriate:

- the exciting device is movable at least between a rest position and a blocked position, the second amplitude $\delta v$ having a first value while the exciting device is in a first range of positions relatively distant from its blocked position and a second value when the exciting device is in its blocked position, the first value being lower than the second value:
- the first value equals 0;
- the second amplitude $\delta v$ is constant (in other words, the valve device oscillates between two fixed stops).

In addition, the invention also has the objective of providing an active hydraulic anti-vibration mount for implementing a method as defined above, this mount being intended to be interposed between two rigid elements, and comprising:

- first and second rigid support elements intended to be integrated respectively with the two rigid elements to be connected,
- an elastomer body connecting the two support elements and partially delimiting a working chamber filled with liquid,
- a flexible wall partially delimiting a compensation chamber filled with liquid, which chamber is linked to the working chamber by a throttled passage also filled with liquid,
- a rigid partition integral with the second support element and interposed between the working chamber and the compensation chamber, this rigid partition including a first regulating nozzle,
- an exciting device which closes the first regulating nozzle of the rigid partition, this exciting device having a first face communicating with the liquid contained in the working chamber and a second face isolated from said working chamber, said exciting device being so mounted as to be movable perpendicularly to the rigid partition at least between a rest position and a blocked position,
- and a control link able to link the exciting device to a control device in order to control the movements of the exciting device, characterized in that the rigid partition is penetrated by a second regulating nozzle which is closed by a valve device movable perpendicularly to the rigid partition, this valve device having a first face in contact with the liquid contained in the working chamber and a second face isolated from the working chamber, the movements of said valve device being limited by first and second stop devices, in that the second stop device is itself movable perpendicularly to the rigid partition between, firstly, a rest position where said second stop device rests against the valve device in order to lock this valve device against the first stop device, and, secondly, an active position where said second stop device is further away from the first stop device and allows the valve device a certain amount of free play, in that the second stop device is elastically loaded towards its rest position, and in that the second stop device is linked to the exciting device by means of a mechanical link with lost motion which is able to:

permit said second stop device to remain in its rest position while the exciting device is in a first range of positions relatively distant from its stop position, displace said second stop device towards its active position when the exciting device is in a second range of positions close to its blocked position, and maintain the second stop device in its active position when the exciting device is in its blocked position.

In preferred embodiments of the anti-vibration mount according to the invention one and or another of the following arrangements can also be used if appropriate:

the second face of the exciting device communicates with a sealed pneumatic chamber which includes a connection able to be connected to an external pneumatic source;

the exciting device is a flexible membrane linked in a sealed manner to a housing and delimiting with it said pneumatic chamber;

the housing of the pneumatic chamber is contained in the compensation chamber;

the flexible membrane is made of elastomer and includes a peripheral bead which projects from the housing of the pneumatic chamber towards the rigid partition and elastically urges the second stop device towards its rest position, said bead being elastically compressible under the pressure of the second stop device when said second stop device is displaced from its rest position to its active position;

the flexible membrane is reinforced by a central reinforcing element which includes hooking fingers extending towards the rigid partition, said hooking fingers engaging with free play on the second stop device when the flexible membrane is in its first range of positions, and said hooking fingers including hooks which come to rest against the second stop device to pull this second stop device towards its active position when the flexible membrane is in its second range of positions;

the hooking fingers are clipped to the second stop device;

the first nozzle is delimited by a tubular duct extending perpendicularly to the rigid wall between a first end which opens in the working chamber and a second end which communicates with the exciting device, this tubular duct being rigid with the second stop device;

the exciting device is a flexible membrane connected in a sealed manner to a casing and delimiting with said casing said pneumatic chamber;

the flexible membrane is reinforced by a central reinforcing element which includes fitting fingers extending towards the rigid wall, said hooking fingers including hooks which are adapted to come into abutment with a flange which is unitary with the tubular duct for driving the second stop device towards its active position when the flexible membrane is in its second range of positions;

the casing is constituted by a cover which has a bottom and a peripheral wall fixed to the second support element, the pneumatic chamber being delimited between the flexible membrane and the bottom of the cover, and the compensation chamber being situated close to the rigid wall in an inner space delimited between said rigid wall and said cover;

the first nozzle communicates with an intermediate hydraulic chamber full of liquid, which is delimited between the flexible membrane and a rigid ring fixed inside the cover;

the rigid ring has a first annular ring, rigidly fixed to the cover and a second annular rim fitted with a compressible elastomer sealing lip which bears in sealing elastic contact against the second stop device;

the second face of the valve device communicates with the compensation chamber;

the second regulating nozzle has an annular form and is arranged around the first regulating nozzle, the valve device forming a ring arranged inside the second regulating nozzle between the first and second stop devices;

the first face of the exciting device communicates with the working chamber by means of an additional throttled passage which is so dimensioned as to present a resonance frequency between 10 and 90 Hz;

the additional throttled passage is delimited between a fixed wall integral with the rigid partition and a rigid plate forming the second stop device;

the elastomer body has a bell-shaped lateral wall extending along a central axis between firstly an apex integral with the first support element, and secondly an annular base integral with the second support element and with the rigid partition, the apex of the elastomer body being hollowed on each side of the first support element at least in a radial direction, so that said apex forms a shear plug of lower stiffness than said lateral wall in said radial direction;

an intermediate rigid reinforcing element is embedded in the elastomer body between the shear plug and the lateral wall, this intermediate reinforcing element surrounding the shear plug and limiting the radial deflections of the first support element.

In addition, a further objective of the invention is a motor vehicle comprising:

a body, an engine mounted on the body by at least one hydraulic anti-vibration mount as defined above, in which the second face of the exciting device communicates with a pneumatic chamber, and a partial vacuum source connected to the pneumatic chamber by means of a control device which is able to:

cyclically vary a gas pressure obtaining inside the pneumatic chamber so as to cause counter-vibrations to be generated in the working chamber by the exciting device when the vehicle engine is idling, and create a permanent partial vacuum in the pneumatic chamber when the vehicle engine is running at a speed faster than idling speed, thus maintaining the exciting device in its stopped position.

Finally, a further objective of the invention is a motor vehicle comprising:

- a body,
- an engine,
- at least one hydraulic anti-vibration mount for implementing a method as defined above, this mount comprising:
    first and second rigid support elements one of which is integrated with the engine and the other with the body,
    an elastomer body connecting the two support elements and partially delimiting a working chamber filled with a certain volume of liquid,
    a flexible wall partially delimiting a compensation chamber filled with liquid, which chamber is linked to the working chamber by a throttled passage also filled with liquid,
    a rigid partition integral with the second support element and interposed between the working chamber and the compensation chamber, this rigid partition including a first regulating nozzle,
    an exciting device which closes the first regulating nozzle of the rigid partition, this exciting device having a first face communicating with the liquid contained in the working chamber and a second face communicating with a pneumatic chamber, said exciting device being so mounted as to be movable perpendicularly to the rigid partition between a rest position and a blocked position,
- and a partial vacuum source connected to the pneumatic chamber by means of a control device which is able to:
    cyclically vary a gas pressure obtaining inside the pneumatic chamber in order to cause the exciting device to vibrate, creating variations in the volume of the working chamber having a first amplitude ΔV in order to generate counter-vibrations, when the vehicle engine is running at idling speed,
    and create a permanent partial vacuum in the pneumatic chamber when the vehicle engine is running at a speed above idling speed, thus maintaining the exciting device in its blocked position, characterized in that the rigid partition is penetrated by a second regulating nozzle which is closed by a valve device freely movable perpendicularly to the rigid partition, this valve device having a first face in contact with the liquid contained in the working chamber and a second face isolated from the working chamber, the movements of said valve device being limited by first and second stop devices so as to permit variations in the volume of the working chamber limited to a second constant amplitude δv such that the relationship δv/ΔV is less than 20%.

BRIEF DESCRIPTION OF THE DRAWINGS

Other characteristics and advantages of the invention will emerge in the course of the following description of three of its embodiments, given by way of non-limiting examples, with reference to the attached drawings.

MORE DETAILED DESCRIPTION

In the different drawings the same references designate identical or similar elements.

In the following description terms such as "high, low, lower, upper, horizontal, vertical" are used for the sole purpose of enhancing the clarity of the description, referring to the most usual position of use of the device according to the invention, but these terms are not limiting.

Figures 1, 2:
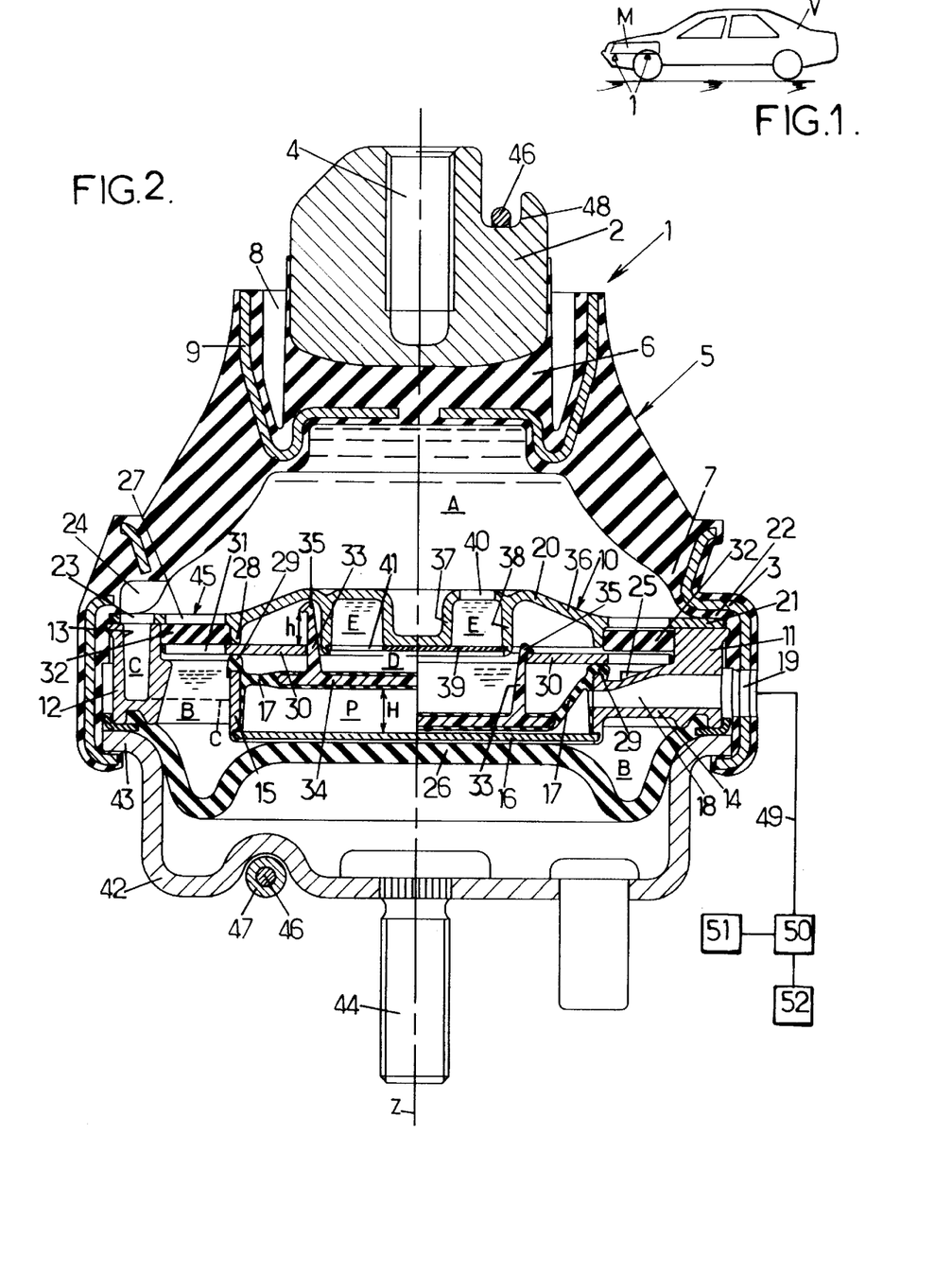
FIG. 1 is a schematic view of a motor vehicle which can be fitted with an anti-vibration mount according to the invention.
FIGS. 2 to 5 are views in vertical cross section of an anti-vibration mount according to four embodiments of the invention, the exciting membrane of the anti-vibration mount being shown in the rest position in the left-hand part of each drawing and in the stop position in the right-hand part of each drawing.

FIG. 1 represents very schematically a motor vehicle the internal combustion engine M of which is mounted on the body V by means of hydraulic anti-vibration mounts 1.

According to a first embodiment of the invention, shown in FIG. 2, the hydraulic anti-vibration mount 1 includes first and second support elements 2,3 which are intended to be fixed respectively to the power unit M and the body V.

In the example considered the first support element 2 has the form of a plug centered on a vertical axis Z and having a threaded hole 4 enabling it to be attached to the power unit M, while the second support element is formed by a steel ring also centered on axis Z.

These two support elements 2,3 are connected by a relatively thick elastomer body 5 which has sufficient resistance to compression to absorb the static loads due to the weight of the power unit. This elastomer body 5 has a bell-shaped side wall extending between an apex portion 6 integrated with plug 2 and an annular base 7 integrated with ring 3.

Advantageously the apex 6 of the elastomer body has an annular recess 8 open at the top and surrounding the plug 2, or, if applicable, several recesses arranged angularly around plug 2. Thus, the apex 6 of the elastomer body, which carries plug 2, forms a shear plug of lower radial stiffness than the side wall of the elastomer body, so that the apex 6 is decoupled radially from the rest of the elastomer body. In this way the transmission of radial vibrations between support elements 2 and 3 is limited. Advantageously, the elastomer body 5 is reinforced by an intermediate reinforcing element 9 which has the form of a rigid metal cup open at the top and is embedded in said elastomer body, this cup 9 being arranged around the annular slit 8 and below plug 2. In addition, cup 9 limits the lateral deflection of plug 2.

In addition, the second support element 3 surrounds a rigid partition 10 which delimits with the elastomer body 5 a working chamber A filled with liquid.

In the example considered here this partition 10 comprises a body 11 cast in light alloy which itself comprises:

- a collar 12 centered on axis Z and having recessed in it a throat 13 open at the top which extends angularly over a part of the periphery of the collar 12,
- a passage 14 extending radially inwardly from collar 12,
- and an inner collar 15 integral with the inner end of passage 14, this collar 15 being also connected if appropriate to collar 12 by supplementary radial supports (not shown) spread around the periphery of said collar.

The lower annular edge of collar 15 is fixed by crimping to a base wall 16 to form a rigid casing, while a flexible elastomer membrane 17 is fixed by bonding to the inner periphery of collar 15, so as to delimit a sealed pneumatic chamber P which communicates only with an air conduit 18 formed by passage 14 and opening to the outside of the anti-vibration mount through a hole 19 formed in support element 3.

In addition, the rigid partition 10 includes a cover 20 which can, like body 11, be cast in light alloy and which covers said body 11 in the direction of working chamber A.

The cover 20 includes a continuous outer annular portion 21 which is applied in sealed contact to a shoulder 22 formed by the base 7 of the elastomer body and reinforced by the upper part of the second support element 3.

This annular outer part 21 of cover 20 closes the upper part of the throat 13 formed in the body of the rigid partition, so as to delimit with this throat a throttled passage C filled with liquid, which extends between:

firstly, a first end which communicates with working chamber A by a hole 23 in the annular outer part 21 of the cover and by a recess 24 formed in the inner part of the base 7 of the elastomer body, secondly, a second end which opens radially to the inside of collar 12 through a recess 25 formed in this collar so as to communicate with a compensation chamber B filled with liquid, which compensation chamber is delimited between the rigid partition 10 and a flexible elastomer wall 26 in the form of a bellows, arranged below partition 10.

In addition, cover 20 also comprises an annular grid 27 extending radially towards the interior of the annular shoulder 21 and formed by a series of holes arranged angularly around axis Z. Level with the inner periphery of grid 27 the cover has a collar 28 centered on axis Z, which collar projects axially downwardly opposite an annular bead 29 forming part of elastomer membrane 17, which bead 29 projects axially upwardly.

Between ring 28 and bead 29 a rigid movable plate 30 is arranged, which plate has an annular form centered on axis Z and extends in a plane perpendicular to said axis Z. The movable plate 30 includes on its outer periphery a series of axial holes distributed angularly and forming a grid 31 arranged opposite the above-mentioned grid 27. These grids 27,31 form an annular regulating nozzle 45 which is closed by a valve 32 formed by an elastomer ring imprisoned axially between grids 27 and 31.

In the rest position of the anti-vibration mount, as illustrated in the left part of FIG. 1, the elastomer bead 29 presses movable plate 30 against the ring 28 of the cover and against valve 32, immobilizing the valve between grids 27 and 31.

In addition, axial hooking fingers 33 are clipped to the inner periphery of movable plate 30, which fingers are distributed angularly on said inner periphery and are formed in one piece with a flat plate of plastic 34 or another reinforcement embedded in the central portion of membrane 17.

Each hooking finger 33 has at its upper end a hook 35 projecting radially outwardly, which hook is arranged at a certain height h above movable plate 30 when the anti-vibration mount is in its rest position shown in the left-hand part of FIG. 1. This height h is less than the height H separating membrane 17 from the base wall 16 of pneumatic chamber P.

The hooking fingers 35 are accommodated in a raised central part 36 of the cover 20 of the rigid partition. This raised inner part has at its center a collar 37 centered on axis Z, inside which collar a throat 38 open at the bottom is formed. In addition, the lower end of collar 37 is crimped on to a closing plate 39 which delimits with throat 38 a throttled passage E extending in an arc of a circle centered on axis Z, between:

firstly, a first end communicating with working chamber A by an orifice 40 formed in cover 20, secondly, a second end communicating with an intermediate chamber D formed between membrane 17 and rigid partition 10, this communication taking place through an orifice 41 formed in closing plate 39.

Finally, a sheet metal casing 42 completes the anti-vibration mount by enclosing the flexible wall 26 from below, the periphery 43 of this casing being applied against the flexible wall 26 which itself rests on the collar 12 of the body of rigid partition 10, and the lower edge of the second support element 3 being crimped below the outer flange 43 of the casing so as to integrate the assembly forming the anti-vibration mount.

The bottom of casing 42 includes fixing means, comprising in particular a stud 44 for fixing said casing to the body V or the vehicle, thus integrating the second support element 3 with said body.

Advantageously, a travel limiter, such as a non-extensible strap 46 formed as a loop and fitted into throats 47,48 formed under casing 42 and in plug 2 respectively, allows the relative deflection of support elements 2,3 parallel to axis Z to be limited.

Finally, air passage 14 is linked to an external pneumatic circuit 49 which is able to communicate either with the air inlet tract 52 of the engine, or with the atmosphere. The communication of circuit 49 with inlet tract 52 or with the atmosphere is effected by means of a three-way solenoid valve 50 controlled by a control circuit 51 such as the on-board computer of the vehicle or suchlike means.

The anti-vibration mount which has just been described operates as follows.

When the vehicle in which the anti-vibration mount is installed is not operating, this mount remains in its rest position shown in the left-hand part of FIG. 1.

When the vehicle's engine has been started and is idling, thus generating level with plug 2 vibration movements generally having a frequency between 20 and 80 Hz, or even between 10 and 90 Hz, the pneumatic chamber P is alternately subjected to a partial vacuum and to atmospheric pressure by the solenoid valve 50 controlled by computer 51. This gives rise to vibration movements of flexible membrane 17, and these vibration movements emit into intermediate chamber D counter-vibrations aimed at neutralizing the effects of the engine vibrations.

These counter-vibrations are optimized by computer 51 according to a predefined program in relation to the running speed of the engine and various parameters which can influence vibration at idling speed (operation of air conditioning, current consumption, engine temperature, etc.), acting, for example, on the following parameters:

the amplitude of the vibrations of membrane 17, which amplitude is controlled by acting on the cyclical relationship of the signal sent to solenoid valve 50 (relationship between the time during which the solenoid valve subjects pneumatic chamber P to partial vacuum and the total duration of a vibration period), the phase of the vibrations of membrane 17, controlled by acting on the initial instant of each activation cycle of solenoid valve 50 in relation to the rotation of the engine, which rotation is registered, for example, by the [piston in] one cylinder reaching its top dead center.

The counter-vibrations thus emitted by membrane 17 into intermediate chamber D are transmitted to working Chamber A through the throttled passage E, which throttled passage is so dimensioned as to have a resonance frequency in the range, for example, from 10 to 90 Hz, and corresponding substantially to the frequency of idling speed.

The presence of throttled passage E therefore firstly permits the counter-vibrations emitted by membrane 17 to be amplified, and secondly allows the higher harmonics of the vibrations to be filtered out, simplifying the control of solenoid valve 50.

When the engine is idling the amplitude of the vibrations to which membrane 17 is subjected is such that the membrane moves from a lower height to the above-mentioned height h in relation to its rest position, at least for the major part of the time, so that valve 32 remains blocked and does not inhibit the effect of said counter-vibrations.

By contrast, when the vehicle is moving solenoid valve 50 is activated so as to subject pneumatic chamber P to a permanent partial vacuum, as shown in the right-hand part of FIG. 1. As a result flexible membrane 17 flattens itself to a considerable extent against base wall 16. In this position of abutment the hooks 35 of hooking fingers 33 pull movable wall 30 downwardly, crushing the annular bead 29, thus giving slight vertical play to valve 32, this play being typically of the order of 0.5 to 1 mm.

Thus, while the vehicle is moving, valve 32 effects an axial decoupling between support elements 2 and 3 with regard to vibrations of high frequency and low amplitude (for example, frequency above 20 Hz or 50 Hz and amplitude less than 1 mm), while throttled passage C is so dimensioned as to represent a resonance frequency generally below 20 Hz, and thus to damp chopping movements of relatively low frequency (for example, below 20 Hz) and of relatively high amplitude (for example, greater than 1 mm) generated by the movement of the vehicle.

It will be noted that it would be possible to eliminate intermediate chamber D and throttled passage E without going beyond the framework of the present invention, membrane 17 then communicating directly with working chamber A.

Furthermore, it would also be possible to replace said membrane 17 by any other exciting device, such as a piston or similar device. In addition, control of membrane 17 or another exciting device is preferably effected by pneumatic means, as indicated above, but could also be effected by electro-mechanical and/or electromagnetic means without thereby going beyond the framework of the invention.

Figure 3:
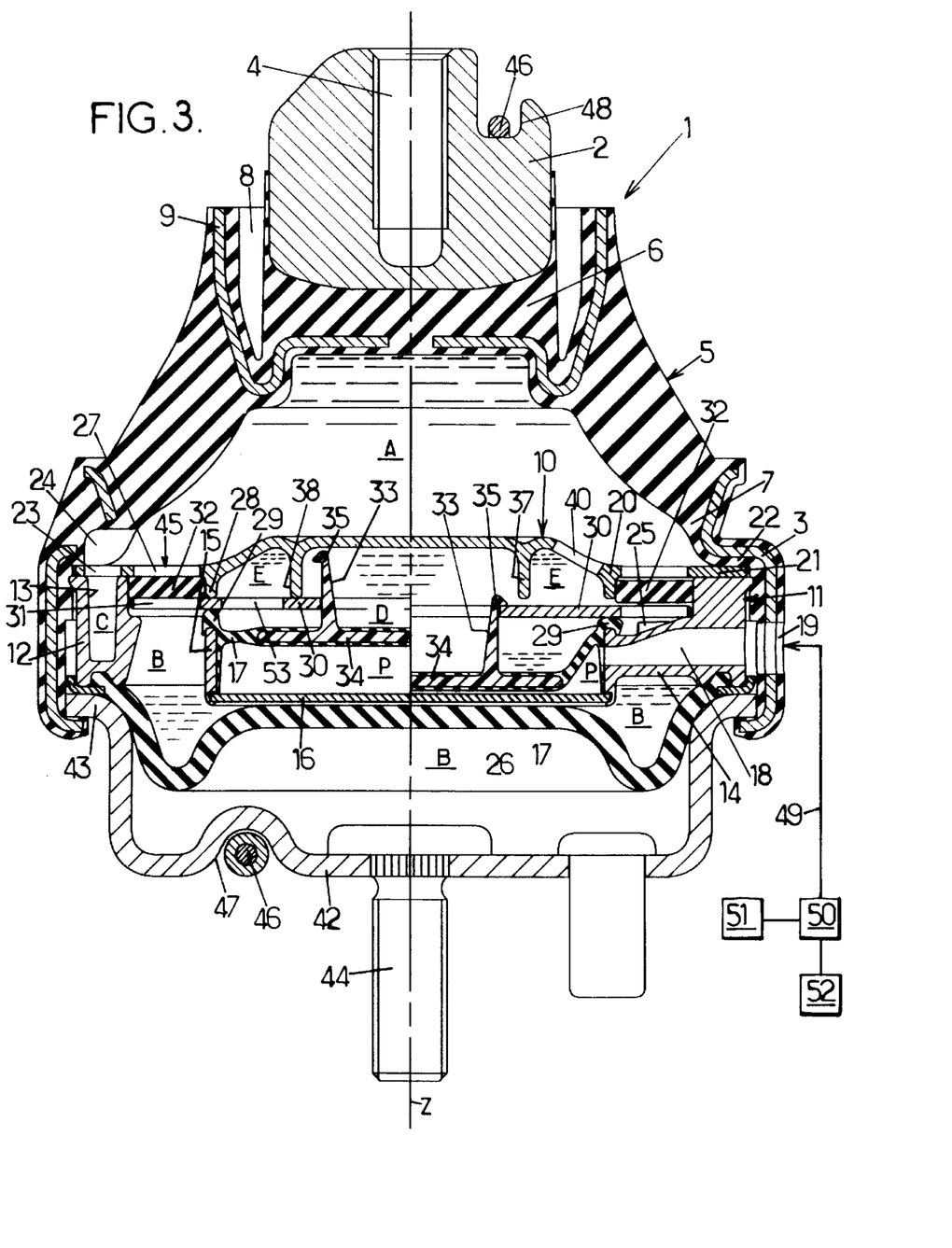

The second embodiment of the invention, represented in FIG. 3, has a structure and operation very similar to the structure and operation of the first embodiment of the invention, so that said second embodiment will not be described in detail here.

This second embodiment differs from the first simply in that closing plate 39 is omitted, the central portion 36 of the cover delimits a hollow space below it located at the center of collar 38, which engages with hooking fingers 33, movable plate 30 cooperates with the cover 20 of the rigid partition to delimit the throttled passage E when said movable plate 30 is in its rest position, the movable plate including an orifice 53 which causes throttled passage E to communicate with intermediate chamber D (the contact between cover 20 and movable plate 30 no longer forms a seal when the vehicle is in the state of moving, as shown in the right-hand part of FIG. 2, but this is unimportant since there is then no or practically no exchange of liquid between intermediate chamber D and working chamber A).

Figure 4:
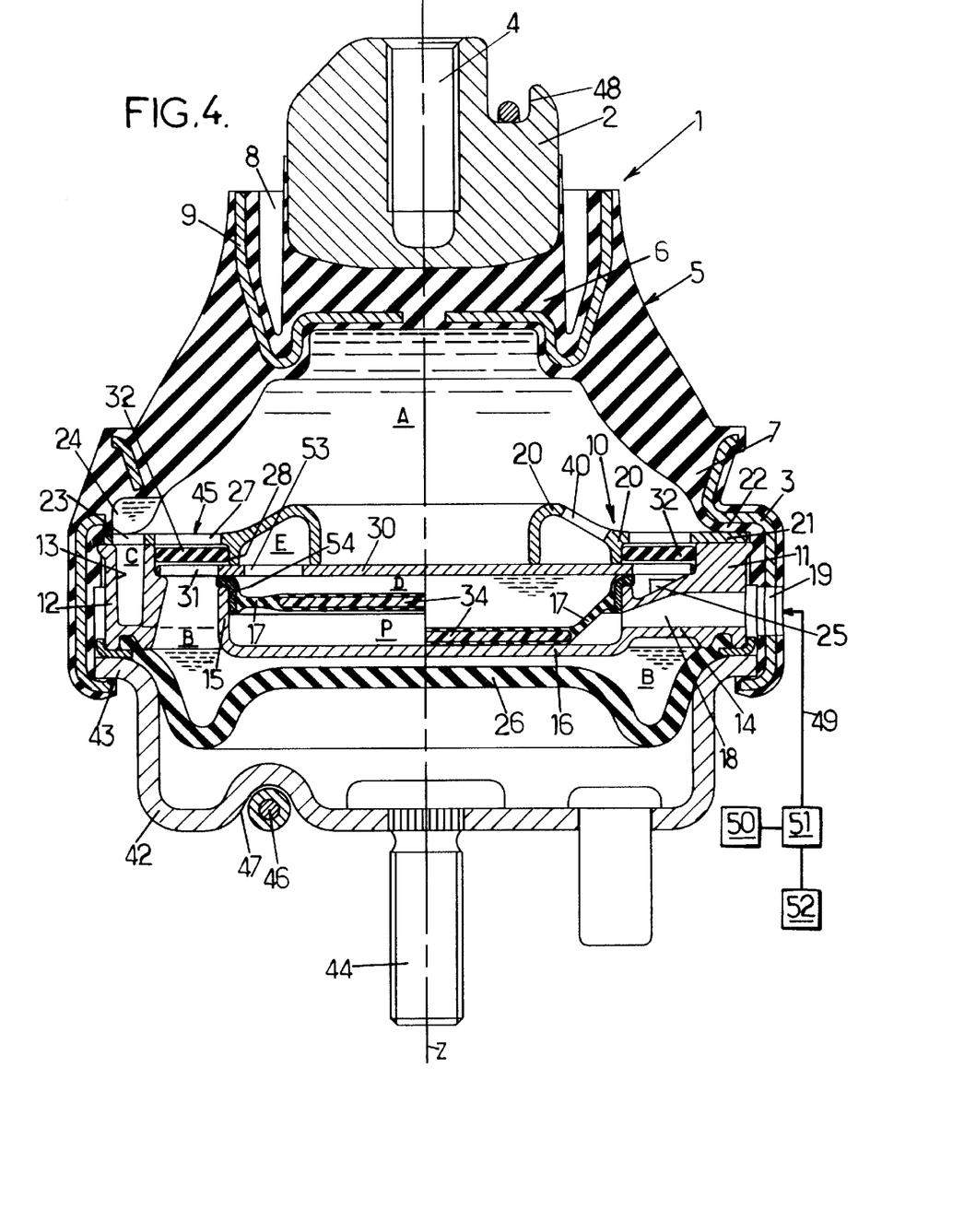

The third embodiment of the invention, represented in FIG. 4, is similar to the second embodiment described above, so that this third embodiment will not be described again in detail.

This third embodiment of the invention differs from the second embodiment by the following points:

plate 30 is immobilized axially by being clamped rigidly between collar 28 and a rigid reinforcing element 54 which reinforces the circumference of membrane 17, which membrane is no longer bonded to collar 15 but is simply held by axial clamping of support element 54 between collar 15 and plate 30, membrane 17 no longer has the elastic bead 29 described earlier, valve 32 is mounted with permanent free play between grids 27 and 31, this free play being sufficiently limited for amplitude δV of the variations in the volume of working chamber A generated by the vibrations of valve 32 not to exceed 20% of the amplitude ΔV of the variations in volume of the working chamber generated by the vibrations of membrane 17 when the engine is idling, so that valve 32 inhibits the counter-vibrations emitted by said membrane 17 to only a very limited degree, reinforcing element 34 of membrane 17 no longer includes hooking fingers 33, and, accessorily, base 16 is formed in one piece with collar 15 to form the casing delimiting pneumatic chamber P.

Figure 5:
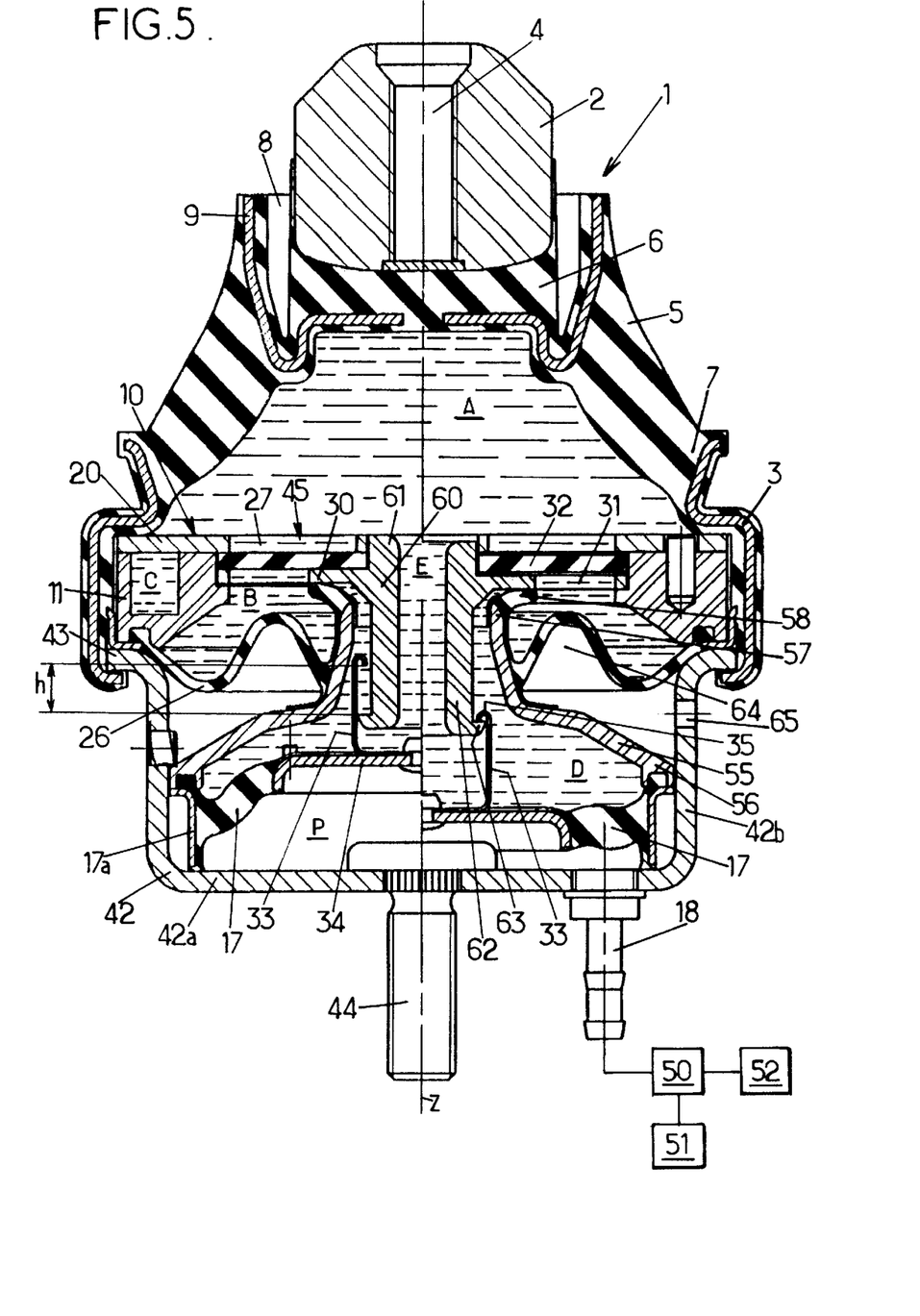

Finally, the fourth embodiment of the invention, represented in FIG. 5 is also similar to the various embodiments described above and it differs thereof by the following points:

the pneumatic chamber P is delimited between the bottom 42a of the casing or cover 42 and the elastomer membrane 17, which membrane may advantageously be provided at its outer periphery with a rigid reinforcement ring 17a which is tightly fitted in the casing 42, the central reinforcement plate 34 of membrane 17, as well as the fingers 33 of said plate 34, may be realized for instance out of metal (of course, plate 34 and fingers 33 could be realized out of plastic in this embodiment, and these elements could be realized out of metal in the embodiments described above), a rigid ring 55 is tightly fitted in the annular side wall 42b of the cover 42, said rigid ring 55 being realized for instance out of light alloy or out of plastic material, said ring 55 having a lower annular rim 56 which is fitted in said side wall 42b and which is bearing on the outer periphery of membrane 17, and an upper annular rim 57 of smaller diameter which is situated close to the rigid wall 10 and which has a compressible lip 58 out of elastomer which bears in liquid tight contact against the movable plate 30 described above, the flexible wall 26 which delimits the compensation chamber B has an annular form, with an inner peripheral rim adhered to the ring 55, said movable plate 30 is rigid with a tube 60 which delimits the throttled passage or nozzle E and which extends between an upper end 61 communicating with the working chamber A and a lower end 62 communicating with the intermediate hydraulic chamber D, the lower end 62 of tube 60 having an outside flange 63 which is engaged between said fingers 33, the hooks 35 formed by these fingers 33 being adapted for coming in abutment against flange 63 and thus driving the tube 60 and the movable plate 30 downwardly when the pneumatic chamber is subjected to a permanent partial vacuum, which compresses the elastomer lip 58 and frees the decoupling valve member 32, which decoupling valve member may thus freely vibrate between the movable plate 30 and the cover 20 of the rigid wall 10, which cover 20 may be here constituted by a simple cut-out steel sheet, a free space 64 of air is delimited between the flexible wall 26 and the ring 55, said space communicating with the atmosphere through one or several holes 65 hollowed out in the side wall 42b.

In this fourth embodiment, the decoupling valve member 32 may have a relatively large surface area, which enables to obtain an excellent efficiency of the acoustic filtering at high frequency. Further, the membrane 17 may itself have a relatively large surface area, which enables to generate a high force when the chamber P is subjected to a partial vacuum.

We claim:

1. A method of damping vibrations between two rigid elements, comprising the following steps:
   (a) providing said rigid elements,
   (b) providing an active hydraulic anti-vibration mount comprising:
      first and second rigid support elements fixed respectively to the two rigid elements to be connected,
      an elastomer body linking the two support elements and partially delimiting a working chamber filled with a certain volume of liquid,
      a flexible wall partially delimiting a compensation chamber filled with liquid, which chamber is linked to the working chamber by a throttled passage also filled with liquid,
      a rigid partition integral with the second support element and interposed between the working chamber and the compensation chamber, said rigid partition including a first regulating nozzle,
      an exciting device which closes the first regulating nozzle of the rigid partition, said exciting device having a first face communicating with the liquid contained in the working chamber and a second face isolated from said working chamber, said exciting device being so mounted as to be movable perpendicularly to the rigid partition, and said exciting device being adapted, when vibrated, for creating variations in the volume of the working chamber with a first amplitude $\Delta V$ in order to generate counter-vibrations in said working chamber,
      a second regulating nozzle going through the rigid partition, said second regulating nozzle being closed by a valve device which is freely movable perpendicularly to the rigid partition, said valve device having a first face in contact with the liquid contained in the working chamber and a second face isolated from the working chamber, the movements of said valve device being limited by first and second stop devices so as to permit variations in the volume of the working chamber limited to a second amplitude $\delta v$ such that the ratio $\delta v/\Delta V$ is less than 20%,
   (b) vibrating the exciting device, thus creating variations in the volume of the working chamber with said first amplitude $\Delta V$ for generating counter-vibrations in said working chamber to at least partially neutralize vibrations between said first and second rigid elements.

2. The method according to claim 1, in which the exciting device is movable at least between the rest position and a blocked position, the second amplitude $\delta v$ having a first value while the exciting device is in a first range of positions relatively distant from the blocked position and a second value when the exciting device is in the blocked position, the first value being lower than the second value.

3. Method according to claim 2, in which the first value equals 0.

4. Method according to claim 1, in which the second amplitude $\delta v$ is constant.

5. Active hydraulic anti-vibration mount intended to be interposed between two rigid elements and comprising:
   first and second rigid support elements intended to be fixed respectively to the two rigid elements to be connected,
   an elastomer body connecting the two support elements and partially delimiting a working chamber filled with liquid,
   a flexible wall partially delimiting a compensation chamber filled with liquid, which chamber is linked to the working chamber by a throttled passage also filled with liquid,
   a rigid partition integral with the second support element and interposed between the working chamber and the compensation chamber, said rigid partition including a first regulating nozzle,
   an exciting device which closes the first regulating nozzle of the rigid partition, said exciting device having a first face communicating with the liquid contained in the working chamber and a second face isolated from said working chamber, said exciting device being so mounted as to be movable perpendicularly to the rigid partition at least between a rest position and a blocked position, and said exciting device being adapted, when vibrated, for generating counter-vibrations in said working chamber to at least partially neutralize vibrations between said first and second rigid elements,
   a control link able to link the exciting device to a control device in order to control the movements of the exciting device,
   a second regulating nozzle going through the rigid partition, said second regulating nozzle being closed by a valve device which is movable perpendicularly to the rigid partition, said valve device having a first face in contact with the liquid contained in the working chamber and a second face isolated from the working chamber, the movements of said valve device being limited by first and second stop devices, said second stop device being movable perpendicularly to the rigid partition between, firstly, a rest position where said second stop device rests against the valve device in order to lock said valve device against the first stop device, and, secondly, an active position where said second stop device is further away from the first stop device and allows the valve device a certain amount of free play, the second stop device being elastically biased towards the rest position thereof, and said second stop device being linked to the exciting device by a mechanical link with lost motion which is able to:
      permit said second stop device to remain in the rest position while the exciting device is in a first range of positions relatively distant from the stop position,
      displace said second stop device towards the active position when the exciting device is in a second range of positions close to the blocked position,
      and maintain the second stop device in the active position when the exciting device is in the blocked position.

6. Anti-vibration mount according to claim 5, in which the second face of the exciting device communicates with a sealed pneumatic chamber which includes a connection able to be connected to an external pneumatic source.

7. Anti-vibration mount according to claim 6, in which the exciting device is a flexible membrane connected in a sealed manner to a casing and delimiting with said casing said pneumatic chamber.

8. Anti-vibration mount according to claim 7, in which the casing of the pneumatic chamber is contained in the compensation chamber.

9. The anti-vibration mount according to claim 7, in which the flexible membrane is made of elastomer and includes a peripheral bead which projects towards the rigid partition from the casing of the pneumatic chamber, said bead elastically urging the second stop device towards the rest position, and said bead being elastically compressible under pressure of the second stop device when said second stop device is moved from the rest position thereof to the active position thereof.

10. The anti-vibration mount according to claim 7, in which the flexible membrane is reinforced by a central reinforcing element which includes hooking fingers extending towards the rigid partition, said hooking fingers being engaged with free play against the second stop device when the flexible membrane is in the first range of positions, and said hooking fingers including hooks which rest against the second stop device in order to pull said second stop device towards the active position when the flexible membrane is in the second range of positions.

11. Anti-vibration mount according to claim 10, in which the hooking fingers are clipped to the second stop device.

12. The anti-vibration mount according to claim 5, wherein the first nozzle is delimited by a tubular duct extending perpendicularly to the rigid wall between a first end which opens in the working chamber and a second end which communicates with the exciting device, said tubular duct being rigid with the second stop device.

13. Anti-vibration mount according to claim 12, wherein the exciting device is a flexible membrane connected in a sealed manner to a casing and delimiting with said casing said pneumatic chamber.

14. Anti-vibration mount according to claim 13, wherein the flexible membrane is reinforced by a central reinforcing element which includes fitting fingers extending towards the rigid wall, said hooking fingers including hooks which are adapted to come into abutment with a flange which is unitary with the tubular duct for driving the second stop device towards its active position when the flexible membrane is in its second range of positions.

15. Anti-vibration mount according to claim 13, wherein the casing is constituted by a cover which has a bottom and a peripheral wall fixed to the second support element, the pneumatic chamber being delimited between the flexible membrane and the bottom of the cover, and the compensation chamber being situated close to the rigid wall in an inner space delimited between said rigid wall and said cover.

16. An-vibration mount according to claim 15, wherein the first nozzle communicates with an intermediate hydraulic chamber full of liquid, which is delimited between the flexible membrane and a rigid ring fixed inside the cover.

17. The anti-vibration mount according to claim 16, wherein the rigid ring has a first annular rim, rigidly fixed to the cover and a second annular rim fitted with a compressible elastomer sealing lip which bears in sealing elastic contact against the second stop device.

18. Anti-vibration mount according to claim 5, in which the second face of the valve device communicates with the compensation chamber.

19. Anti-vibration mount according to claim 5, in which the second regulating nozzle has an annular form and is arranged around the first regulating nozzle, the valve device forming a ring which is arranged inside the second regulating nozzle between the first and second stop devices.

20. The anti-vibration mount according to claim 5, in which the first face of the exciting device communicates with the working chamber through an additional throttled passage which is so dimensioned as to have a resonance frequency between 10 and 90 Hz.

21. Anti-vibration mount according to claim 20, in which the additional throttled passage is delimited between a fixed wall integral with the rigid partition and a rigid plate forming the second stop device.

22. Anti-vibration mount according to claim 5, in which the elastomer body has a bell-shaped side wall extending along a central axis between, firstly, an apex integral with the first support element and, secondly, an annular base integral with the second support element and with the rigid partition, the apex of the elastomer body having recesses on each side of the first support element at least in a radial direction, so that said apex forms a shear plug having lower stiffness than said side wall in said radial direction.

23. The anti-vibration mount according to claim 22, in which an intermediate rigid reinforcement is embedded in the elastomer body between the shear plug and the side wall, said intermediate reinforcing element surrounding the shear plug and limiting radial movements of the first support element.

24. Motor vehicle comprising:
a body,
an engine mounted on the body by at least one hydraulic anti-vibration mount comprising:
first and second rigid support elements fixed respectively to the engine and the body,
an elastomer body connecting the two support elements and partially delimiting a working chamber filled with a certain volume of liquid,
a flexible wall partially delimiting a compensation chamber filled with liquid, which chamber is linked to the working chamber by a throttled passage also filled with liquid,
a rigid partition integral with the second support element and interposed between the working chamber and the compensation chamber, said rigid partition including a first regulating nozzle,
an exciting device which closes the first regulating nozzle of the rigid partition, said exciting device having a first face communicating with the liquid contained in the working chamber and a second face communicating with a pneumatic chamber isolated from said working chamber, said exciting device being so mounted as to be movable perpendicularly to the rigid partition at least between a rest position and a blocked position, and said exciting device being adapted, when vibrated, for generating counter-vibrations in said working chamber to at least partially neutralize vibrations between said first and second rigid elements,
a second regulating nozzle going through the rigid partition, said second regulating nozzle being closed by a valve device which is movable perpendicularly to the rigid partition, said valve device having a first face in contact with the liquid contained in the working chamber and a second face isolated from the working chamber, the movements of said valve device being limited by first and second stop devices, said second stop device being movable perpendicularly to the rigid partition between, firstly, a rest position where said second stop device rests against the valve device in order to lock said valve device against the first stop device, and, secondly, an active position where said second stop device is further away from the first stop device and allows the valve device a certain amount of free play, the second stop device being elastically biased towards the rest position thereof and said second stop device being linked to the exciting device by a mechanical link with lost motion which is able to:

permit said second stop device to remain in the rest position while the exciting device is in a first range of positions relatively distant from the stop position, displace said second stop device towards the active position when the exciting device is in a second range of positions close to the blocked position, and maintain the second stop device in the active position when the exciting device is in the blocked position, and a partial vacuum source connected to the pneumatic chamber by a control device, said control device being able to:

cyclically vary a gas pressure reigning inside the pneumatic chamber so as to cause counter-vibrations to be generated in the working chamber by the exciting device when the vehicle engine is idling, to at least partially neutralize vibrations between said first and second rigid elements, and create a permanent partial vacuum in the pneumatic chamber when the vehicle engine is running at a speed faster than idling speed, thus maintaining the exciting device in the blocked position.

25. A motor vehicle comprising:

a body, an engine, at least one hydraulic anti-vibration mount comprising:
first and second rigid support elements one of which is fixed to the engine and the other to the body,
an elastomer body connecting the two support elements and partially delimiting a working chamber filled with a certain volume of liquid,
a flexible wall partially delimiting a compensation chamber filled with liquid, which chamber is linked to the working chamber by a throttled passage also filled with liquid,
a rigid partition integral with the second support element and interposed between the working chamber and the compensation chamber, said rigid partition including a first regulating nozzle,
an exciting device which closes the first regulating nozzle of the rigid partition, said exciting device having a first face communicating with the liquid contained in the working chamber and a second face communicating with a pneumatic chamber, said exciting device being so mounted as to be movable perpendicularly to the rigid partition between a rest position and a blocked position, for creating variation in the volume of the working chamber having a first amplitude $\Delta V$ in order to generate counter-vibrations,
a second regulating nozzle going through the rigid partition, said second regulating nozzle being closed by a valve device which is freely movable perpendicularly to the rigid partition, said valve device having a first face in contact with the liquid contained in the working chamber and a second face isolated from the working chamber, the movements of said valve device being limited by first and second stop devices so as to permit variations in the volume of the working chamber limited to a second constant amplitude $\delta v$ such that the ratio $\delta v/\Delta V$ is less than 20%,
and a partial vacuum source connected to the pneumatic chamber by a control device which is able to:
cyclically vary a gas pressure obtaining inside the pneumatic chamber in order to cause the exciting device to vibrate, creating variation in the volume of the working chamber having said first amplitude $\Delta V$ in order to generate counter-vibrations, when the vehicle engine is running at idling speed,
and create a permanent partial vacuum in the pneumatic chamber when the vehicle engine is running at a speed above idling speed, thus maintaining the exciting device in the blocked position.

* * * * *